Patented Oct. 17, 1939

2,176,419

UNITED STATES PATENT OFFICE 2,176,419

ENDOTHERMIC CHEMICAL PROCESSES CARRIED OUT IN THE GASEOUS PHASE

Henry Dreyfus, London, England

No Drawing. Application June 3, 1936, Serial No. 83,270. In Great Britain June 12, 1935

4 Claims. (Cl. 260—547)

This invention relates to improvements in or relating to chemical processes, and is particularly concerned with a method of carrying out chemical processes in the gaseous or vapor phase.

Many chemical processes carried out on a commercial scale in the gaseous or vapor phase involve endothermic chemical reactions, i. e. reactions which proceed with an absorption of heat. In practice preheating of the starting materials is frequently resorted to, in order to reduce the amount of heat which must be supplied through the medium of the reaction zone or the catalyst contained therein, and to obtain a better control over the supply of heat to the process.

It has been found, however, that formation of undesired products by decomposition of the starting material or reaction between constituents thereof is liable to occur during preheating and also in the reaction zone. As regards preheating this formation of undesired products is particularly noticeable in the later stages, where the starting material is at a high temperature but is not under the influence of a catalyst to direct its decomposition or reaction in the desired direction. In the reaction zone the undesired products may be formed not only by overheating of the starting material but also by decomposition or too-extensive reaction after the gases or vapors taking part in the process have left the catalyst; for instance when the process is carried out by passage of gases or vapors into the lower regions of a liquid or molten catalyst the gaseous or vaporous product is liable to undergo deterioration during its passage through the hot space above the surface of the catalyst.

According to the present invention, in carrying out processes of the type referred to above, the pressure is reduced at some point in the system after the starting material has been subjected to preheating or reaction, or to an initial stage of preheating or reaction. By means of the invention it has been found possible to reduce very considerably the formation, in the manner referred to above, of undesired products.

In carrying out the invention the starting material may be preheated, the pressure reduced and the starting material then subjected to further preheating while under reduced pressure before being supplied to the reaction zone. Alternatively the starting material may be heated to the desired preheating temperature, the pressure reduced and the starting material then supplied immediately to the reaction zone, or the reduction in pressure may be effected at some point in the travel of the starting material through the reaction zone.

The means adopted for bringing about the reduction in pressure may be varied according to the point in the system at which it is desired to reduce the pressure. It may be remarked, however, that a method found very satisfactory consists of inserting a perforated plate at the point where the reduction in pressure is desired and causing the gases or vapors to pass through the perforated plate under the action of a suction pump operating at a later point in the system with respect to the path of the gases or vapors. The size and number of perforations in such a plate will be related to the suction developed by the pump and the speed at which it is desired to pass the gases or vapors through the reaction zone.

The pump in such an arrangement may be placed after the reaction zone or, where the products of the process are passed into distillation columns for separation, after such column or columns. In this connection it is to be noted that, as is described in prior U. S. Patent No. 1,735,957, the thermal decomposition of acetic acid and the separation of acetic anhydride thus produced from water present in the products are very advantageously carried out under reduced pressure. The production of acetic and other aliphatic anhydrides, e. g. propionic anhydride or butyric anhydride, by thermal decomposition of the corresponding aliphatic acids forms an important part of the present invention and is very advantageously carried out by preheating the aliphatic acid in two stages, the first stage at normal or even super-atmospheric pressure and the second stage of preheating, the thermal decomposition and the separation of the anhydride-water mixture produced all being effected under reduced pressure. The production of ketene by thermal decomposition of acetic acid vapor is a further example of a process to which the present invention may with advantage be applied.

By means of the invention it has been found possible to preheat the acid vapor to the temperature at which it is to be thermally decomposed, or to a temperature approximating thereto. For instance, acetic acid vapor may be preheated at normal atmospheric pressure to a temperature of 400 to 500°, the pressure reduced to 250 to 300 mm. of mercury, and the vapor then further preheated to the thermal decomposition temperature, e. g. 650 to 700° C. or even to a higher temperature, e. g. 700 to 850° C. or more. In addition the process of the present invention enables higher temperatures than usual to be employed in the thermal decomposition zone itself without serious loss of starting material and products by decomposition to unwanted gaseous substances.

It may in some cases be desirable to operate the later stage or stages of the process under very low pressure, for instance, a pressure of 10-30 mm. This may be the case in the thermal decomposition of acetic acid to produce acetic anhydride or ketene, the use of very low pressure during the actual decomposition being especially advantageous in the production of ketene. In such cases the pressure may be reduced at more than one point in the system; for instance, after an initial stage of preheating followed by a reduction in pressure, for instance to 100-150 mm., the starting material may be further preheated and then further reduced in pressure, for instance to 10-30 mm., before being supplied to the reaction zone.

The invention is not limited to the production of ketene or aliphatic anhydrides but may be applied to other processes involving endothermic chemical reactions. Thus the invention may be applied to the cracking of hydrocarbons to produce hydrocarbons of lower molecular weight or lower hydrogen content, whether the starting materials employed are relatively high boiling hydrocarbons and are cracked to produce gaseous and/or normally liquid low boiling hydrocarbons, or are themselves gaseous hydrocarbons. In this latter connection it is to be noted that the invention may be applied to the production of acetylene from methane, for instance by the process described in U. S. application S. No. 81,267, filed May 22, 1936.

Instead of, but preferably in addition to, reducing the absolute pressure at parts of the system, the partial pressure of the reactant or reactants may be reduced by means of inert diluent gases or vapors. Thus such a diluent may be supplied to the gases or vapors taking part in the process at some point in the system after these gases or vapors have been subjected to preheating or reaction, or to an initial stage of preheating or reaction. In order to avoid undue cooling of the gases or vapors the diluent should, of course, itself be heated before admixture therewith, preferably to at least the temperature of the gases or vapors. There is thus effected a reduction of the partial pressure of the gases or vapors taking part in the process.

Having described my invention, what I desire to secure by Letters Patent is:

1. Method of carrying out an endothermic chemical process, wherein a gaseous or vaporous current is passed through a system including a reaction zone in which the endothermic chemical process takes place in the gaseous or vaporous phase and wherein the pressure is maintained not substantially over 300 millimeters of mercury by means of a suction pump, which comprises supplying at least a part of the heat required by the process to the starting material in gas or vapor form and thereafter bringing about a drop in pressure in the gaseous or vaporous current to substantially below atmospheric pressure with the aid of a constriction in the system.

2. Method of carrying out an endothermic chemical process, which comprises preheating a current of gaseous or vaporous starting material, reducing the pressure in the material to substantially below atmospheric pressure by passage through a constriction under the action of a suction pump and thereafter introducing the starting material into the reaction zone wherein the pressure is maintained not substantially over 300 millimeters of mercury.

3. Method of carrying out an endothermic chemical process, wherein a current of acetic acid vapor is passed through a system including a reaction zone in which the thermal dehydration takes place in the vapor phase and wherein the pressure is maintained not substantially over 300 millimeters of mercury by means of a suction pump, which comprises supplying at least a part of the heat required by the process to the acetic acid vapor and thereafter bringing about a drop in pressure in the vaporous current to substantially below atmospheric pressure with the aid of a constriction in the system.

4. Method of carrying out an endothermic chemical process, which comprises preheating a current of acetic acid vapor, then reducing the pressure on the current of acetic acid vapor to substantially below atmospheric pressure by passage through a constriction under the action of a suction pump and thereafter introducing the acetic acid vapor into the reaction zone wherein the pressure is maintained not substantially over 300 millimeters of mercury.

HENRY DREYFUS.